United States Patent
Zhang et al.

(10) Patent No.: US 10,298,341 B2
(45) Date of Patent: May 21, 2019

(54) TRANSMISSION DEVICE AND RECEIVING DEVICE

(71) Applicant: SONY CORPORATION, Tokyo (JP)

(72) Inventors: Zaichen Zhang, Jiangsu (CN); Rong Zeng, Jiangsu (CN); Liang Wu, Jiangsu (CN)

(73) Assignee: Sony Corporation, Tokyo (JP)

( * ) Notice: Subject to any disclaimer, the term of this patent is extended or adjusted under 35 U.S.C. 154(b) by 37 days.

(21) Appl. No.: 15/531,291

(22) PCT Filed: Oct. 15, 2015

(86) PCT No.: PCT/CN2015/091999
§ 371 (c)(1),
(2) Date: May 26, 2017

(87) PCT Pub. No.: WO2016/086725
PCT Pub. Date: Jun. 9, 2016

(65) Prior Publication Data
US 2018/0054267 A1    Feb. 22, 2018

(30) Foreign Application Priority Data
Dec. 3, 2014    (CN) .......................... 2014 1 0727480

(51) Int. Cl.
*H04B 17/336*    (2015.01)
*H04L 25/03*    (2006.01)
*H04L 25/02*    (2006.01)

(52) U.S. Cl.
CPC ....... *H04B 17/336* (2015.01); *H04L 25/0226* (2013.01); *H04L 25/03* (2013.01); *H04L 25/0202* (2013.01)

(58) Field of Classification Search
CPC ... H04B 17/336; H04L 25/0226; H04L 25/03; H04L 25/0202
See application file for complete search history.

(56) References Cited

U.S. PATENT DOCUMENTS

| | | | | |
|---|---|---|---|---|
| 2008/0107048 A1* | 5/2008 | Jalali | ................... | H04B 7/0434 370/280 |
| 2011/0085537 A1* | 4/2011 | Tsai | ................... | H04B 7/0619 370/342 |

(Continued)

FOREIGN PATENT DOCUMENTS

CN    101227697 A    7/2008

OTHER PUBLICATIONS

Ling-ming Xia, et al., "OFDM Channel Estimation Based on Novel Grouped Pilot Tones," Journal of the China Railway Society, vol. 36, No. 10, Oct. 2014, pp. 48-52 (with English abstract).

(Continued)

*Primary Examiner* — Steven H Nguyen
(74) *Attorney, Agent, or Firm* — Xsensus, LLP

(57) ABSTRACT

A transmitting device and a receiving device. The receiving device includes: a signal to noise ratio measuring device, configured to measure a signal to noise ratio of a pilot frequency aggregation bit stream after demodulation and before coding; a pilot frequency parameter adjusting device configured to adaptively adjust a width of the pilot frequency aggregation and/or interval of pilot frequency clusters according to the signal to noise ratio measured by the signal to noise ratio measuring device; and a frequency parameter reporting device configured to report the width of pilot frequency aggregation and/or the pilot frequency cluster interval adjusted by the pilot frequency parameter adjusting device to the transmitting device.

10 Claims, 6 Drawing Sheets

(56) References Cited

U.S. PATENT DOCUMENTS

2011/0255584 A1* 10/2011 Dateki .............. H04W 72/0413
375/224
2016/0128100 A1* 5/2016 Yi ........................ H04L 5/0016
370/329

OTHER PUBLICATIONS

International Search Report dated Feb. 2, 2016 in PCT/CN2015/091999 filed Oct. 15, 2015.

* cited by examiner

TRANSMISSION DEVICE AND RECEIVING DEVICE

TECHNICAL FIELD

The present invention relates generally to the field of wireless communication. Particularly, the present invention relates to a transmitting apparatus and a receiving apparatus as well as a corresponding transmitting method and a corresponding receiving method in a wireless communication system.

BACKGROUND ART

In recent years, the wireless communication technique has been greatly developed. However, a problem concerning how to improve time-varying channel estimation performance as far as possible in the case of a time-varying channel exists in the wireless communication technique all the time. Besides, this problem is becoming more and more prominent and serious along with the continuous expansion of the fields to which the wireless communication technique is applied.

For example, in a traditional mobile communication system, such as a 2G or 3G mobile communication system, the design of the system always focuses on the cases of medium and low motion speeds. However, a demand for realizing high-speed transmission of data at a high motion speed arises along with the popularity of bullet trains and high-speed rails. The traditional mobile communication system designed directed to the cases of medium and low motion speeds fails to satisfy such a demand, because a high-speed motion environment will cause a fast time-varying characteristic of a wireless communication channel. If a receiver performs coherent demodulation, the fast time-varying characteristic of the channel will make channel estimation and tracking extremely difficult.

The traditional channel estimation method is always based on a condition that multipath time-varying channel parameters are known, without considering the complexity of channel estimation. However, the multipath time-varying channel parameters are unknown due to the fast time-varying characteristic of the wireless communication channel. Besides, in a case where the multipath time-varying channel parameters are known, the complexities of demodulation and detection algorithms are still relatively high.

In addition, the traditional method fails to essentially solve the problem of inter-subcarrier interference (ICI) caused by the fast time-varying characteristic of the channel. In the current mobile communication systems for business, a pilot-based channel estimation manner has been widely used. In a time-varying channel environment, positions of pilot symbols suffer from serious ICI, such that the channel estimation performance is abruptly worsened. It is difficult for the pilot symbol mapping scheme designed directed to the cases of medium and low motion speeds to satisfy the performance requirements of the system in the high-speed motion environment. On one hand, in the traditional pilot symbol mapping scheme, pilots are transmitted non-continuously in time and frequency domains, which is based on an assumption that the wireless communication channel does not vary within one demodulation symbol period. However, this assumption is approximately tenable in the cases of medium and low motion speeds, but in a high-speed motion environment, the wireless communication channel varies within one demodulation symbol period. On the other hand, in the high-speed motion environment, it is necessary to transmit pilot symbols within each demodulation symbol period, and at this time pilot overheads of the system rapidly increases, thus greatly influencing the throughput and the frequency utilization rate of the system.

Thus, it is desired to, with respect to the high-speed motion environment, optimize the design of the pilot symbol mapping scheme to improve the phenomenon of ICI, adapting to the fast time-varying characteristic of the wireless communication channel, and making it possible to effectively control the overheads of the pilots, thus improving the channel estimation performance.

With respect to the above problem existing in the prior art, a transmitting apparatus and a receiving apparatus as well as a corresponding transmitting method and a corresponding receiving method according to the present invention are proposed.

SUMMARY OF THE INVENTION

A brief summary of the present invention is given below to provide a basic understanding of some aspects of the present invention. It should be understood that the summary is not exhaustive; it does not intend to define a key or important part of the present invention, nor does it intend to limit the scope of the present invention. The object of the summary is only to briefly present some concepts, which serves as a preamble of the detailed description that follows.

An object of the present invention is to propose a transmitting apparatus and a receiving apparatus as well as a corresponding transmitting method and a corresponding receiving method which can solve the above problem in the prior art.

To achieve the above object, according to one aspect of the present invention, there is provided a receiving apparatus, comprising: signal-to-noise ratio measuring device configured to measure a signal-to-noise ratio of a pilot aggregation bit stream after demodulation and before decoding; pilot parameter adjusting device configured to adjust a pilot aggregation width and/or a pilot cluster interval adaptively according to the signal-to-noise ratio measured by the signal-to-noise measuring device; and pilot parameter reporting device configured to report, to a transmitting apparatus, the pilot aggregation width and/or the pilot cluster interval adjusted by the pilot parameter adjusting device; wherein in a pilot aggregation signal corresponding to the pilot aggregation bit stream, each pilot symbol closely neighbors known symbols at both sides in a frequency domain, so as to constitute a pilot cluster, the pilot aggregation width refers to a total number of pilot symbols and known symbols contained in each pilot cluster, and the pilot cluster interval refers to an interval between pilot symbols at center positions of two neighboring pilot clusters.

According to another aspect of the present invention, there is provided a transmitting apparatus, comprising: pilot parameter obtaining device configured to obtain a pilot aggregation width and/or a pilot cluster interval reported by a receiving apparatus; and transmitting device configured to transmit a pilot aggregation signal to the receiving apparatus according to the pilot aggregation width and/or the pilot cluster interval obtained by the pilot parameter obtaining device; wherein in the pilot aggregation signal, each pilot symbol closely neighbors known symbols at both sides in a frequency domain, so as to constitute a pilot cluster, the pilot aggregation width refers to a total number of pilot symbols and known symbols contained in each pilot cluster, and the pilot cluster interval refers to an interval between pilot symbols at center positions of two neighboring pilot clusters.

According to yet another aspect of the present invention, there is provided a receiving apparatus, comprising: signal-to-noise ratio measuring device configured to measure a signal-to-noise ratio of a pilot aggregation bit stream after demodulation and before decoding; and signal-to-noise ratio reporting device configured to report the signal-to-noise ratio measured by the signal-to-noise measuring device to a transmitting apparatus; wherein in a pilot aggregation signal corresponding to the pilot aggregation bit stream, each pilot symbol closely neighbors known symbols at both sides in a frequency domain, so as to constitute a pilot cluster, the pilot aggregation width refers to a total number of pilot symbols and known symbols contained in each pilot cluster, and the pilot cluster interval refers to an interval between pilot symbols at center positions of two neighboring pilot clusters.

According to yet another aspect of the present invention, there is provided a transmitting apparatus, comprising: signal-to-noise ratio obtaining device configured to obtain a signal-to-noise ratio reported by a receiving apparatus; pilot parameter adjusting device configured to adjust a pilot aggregation width and/or a pilot cluster interval adaptively according to the signal-to-noise ratio obtained by the signal-to-noise obtaining device; pilot parameter notifying device configured to notify the receiving apparatus of the pilot aggregation width and/or the pilot cluster interval adjusted by the pilot parameter adjusting device; and transmitting device configured to transmit a pilot aggregation signal to the receiving apparatus according to the pilot aggregation width and/or the pilot cluster interval adjusted by the pilot parameter adjusting device; wherein in the pilot aggregation signal, each pilot symbol closely neighbors known symbols at both sides in a frequency domain, so as to constitute a pilot cluster, the pilot aggregation width refers to a total number of pilot symbols and known symbols contained in each pilot cluster, and the pilot cluster interval refers to an interval between pilot symbols at center positions of two neighboring pilot clusters.

According to yet another aspect of the present invention, there is provided a receiving method, comprising: measuring a signal-to-noise ratio of a pilot aggregation bit stream after demodulation and before decoding; adjusting a pilot aggregation width and/or a pilot cluster interval adaptively according to the measured signal-to-noise ratio; and reporting, to a transmitting apparatus, the adjusted pilot aggregation width and/or pilot cluster interval; wherein in a pilot aggregation signal corresponding to the pilot aggregation bit stream, each pilot symbol closely neighbors known symbols at both sides in a frequency domain, so as to constitute a pilot cluster, the pilot aggregation width refers to a total number of pilot symbols and known symbols contained in each pilot cluster, and the pilot cluster interval refers to an interval between pilot symbols at center positions of two neighboring pilot clusters.

According to yet another aspect of the present invention, there is provided a transmitting method, comprising: obtaining a pilot aggregation width and/or a pilot cluster interval reported by a receiving apparatus; and transmitting a pilot aggregation signal to the receiving apparatus according to the obtained pilot aggregation width and/or pilot cluster interval; wherein in the pilot aggregation signal, each pilot symbol closely neighbors known symbols at both sides in a frequency domain, so as to constitute a pilot cluster, the pilot aggregation width refers to a total number of pilot symbols and known symbols contained in each pilot cluster, and the pilot cluster interval refers to an interval between pilot symbols at center positions of two neighboring pilot clusters.

According to yet another aspect of the present invention, there is provided a receiving method, comprising: measuring a signal-to-noise ratio of a pilot aggregation bit stream after demodulation and before decoding; and reporting the measured signal-to-noise ratio to a transmitting apparatus; wherein in a pilot aggregation signal corresponding to the pilot aggregation bit stream, each pilot symbol closely neighbors known symbols at both sides in a frequency domain, so as to constitute a pilot cluster, the pilot aggregation width refers to a total number of pilot symbols and known symbols contained in each pilot cluster, and the pilot cluster interval refers to an interval between pilot symbols at center positions of two neighboring pilot clusters.

According to yet another aspect of the present invention, there is provided a transmitting method, comprising: obtaining a signal-to-noise ratio reported by a receiving apparatus; adjusting a pilot aggregation width and/or a pilot cluster interval adaptively according to the obtained signal-to-noise ratio; and notifying the receiving apparatus of the adjusted pilot aggregation width and/or pilot cluster interval; and transmitting a pilot aggregation signal to the receiving apparatus according to the adjusted pilot aggregation width and/or pilot cluster interval; wherein in the pilot aggregation signal, each pilot symbol closely neighbors known symbols at both sides in a frequency domain, so as to constitute a pilot cluster, the pilot aggregation width refers to a total number of pilot symbols and known symbols contained in each pilot cluster, and the pilot cluster interval refers to an interval between pilot symbols at center positions of two neighboring pilot clusters.

In addition, according to another aspect of the present invention, there is further provided a storage medium. The storage medium comprises machine-readable program code that, when executed on an information processing apparatus, causes the information processing apparatus to implement the aforesaid method according to the present invention.

Besides, according to yet another aspect of the present invention, there is provided a program product. The program product comprises machine-exactable instructions that, when executed on an information processing apparatus, causes the information processing apparatus to implement the aforesaid method according to the present invention.

BRIEF DESCRIPTION OF THE DRAWINGS

The above and other objects, features and advantages of the present invention would be understood more easily with reference to embodiments of the present invention which are described in combination with the appended drawings below. Components in the appended drawings aim only to show the principle of the present invention. In the appended drawings, identical or similar technical features or components are denoted by same or similar reference signs. In the appended drawings.

DETAILED DESCRIPTION OF THE EMBODIMENTS

Exemplary embodiments of the present invention will be described in detail combined with the appended drawings below. For the sake of clarity and conciseness, the specification does not describe all features of actual embodiments. However, it should be understood that in developing any such actual embodiment, many decisions specific to the embodiments must be made, so as to achieve specific objects of a developer; for example, those limitation conditions related to the system and services are met, and these limitation conditions possibly would vary as embodiments are different. In addition, it should be appreciated that although developing tasks are possibly complicated and time-consuming, such developing tasks are only routine tasks for those skilled in the art benefiting from the contents of the disclosure.

It should also be noted herein that, to avoid the present invention from being obscured due to unnecessary details, only those device structures and/or processing steps closely related to the solution according to the present invention are shown in the appended drawings, while omitting other details not closely related to the present invention. In addition, it should also be noted that elements and features described in one figure or one embodiment of the present invention can be combined with elements and features shown in one or more other figures or embodiments.

The basic concept of the present invention is: to improve the precision of channel estimation by using pilot aggregation technique, to reduce ICI by arranging known symbols at both sides of a pilot symbol, and to adapt to a fast time-varying characteristic of a channel and reduce pilot overheads by adjusting a pilot aggregation width and/or a pilot cluster interval adaptively according to the signal-to-noise ratio.

First, the concept of pilot aggregation is explained with reference to FIG. 1.

Figure 1:
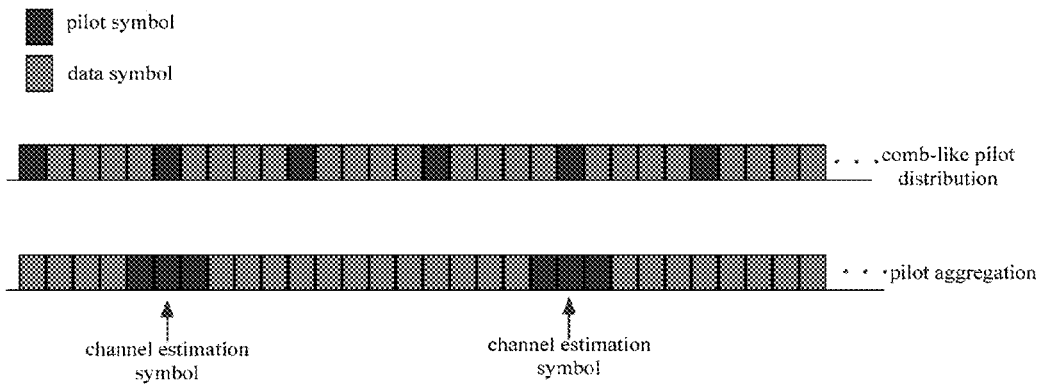
FIG. 1 is a diagram for explaining the concept of pilot aggregation.

As shown in the upper portion of FIG. 1, in comb-like pilot distribution, pilot symbols are distributed in data symbols in frequency domain, the pilot symbols do not neighbor each other, and closely neighboring symbols at both sides of the pilot symbols are unknown. As shown in the lower portion of FIG. 1, in pilot aggregation, a plurality of pilot symbols closely neighbor each other to form a pilot cluster, a plurality of pilot clusters are distributed in the data symbols in frequency domain, and the pilot clusters do not neighbor each other.

As can be seen, the pilot aggregation refers to that in a pilot aggregation signal, pilot symbols are aggregated into a pilot cluster in frequency domain. By using the pilot aggregation, the precision of channel estimation can be improved; however, since a faster motion speed needs more continuous pilots, a fixed pilot aggregation scheme will increase unnecessary pilot overheads.

To reduce interference produced by closely neighboring symbols at both sides of a pilot symbol to the pilot symbol, the inventor of the present invention proposes arranging known symbols at both sides of a pilot symbol. Interference suffered by each sub-carrier which is produced by symbols transmitted on other sub-carriers is related to a distance between the sub-carriers. The interference suffered is stronger when the distance between the sub-carriers is closer. Thus, the interference between the sub-carriers mainly results from the symbols transmitted on close sub-carriers.

Since the closely neighboring symbols at both sides of the pilot symbol are known, interference produced by the closely neighboring symbols at both sides of the pilot symbol to the pilot symbol which plays a major role in ICI becomes known, thus facilitating calculation and elimination of ICI. The performance of channel estimation algorithm can be improved using a signal processing method, such as zero forcing equalization and interference cancellation.

The known symbols may be either pilot symbols or zero, and may also be any other known symbols flexibly set by those skilled in the art.

When the known symbols are pilot symbols, the pilot aggregation signal according to the present invention is as shown in the lower portion of FIG. 1.

The pilot aggregation width refers to a total number of pilot symbols and known symbols contained in each pilot cluster. In the example as shown in the lower portion of FIG. 1, the pilot aggregation width is 3.

Preferably, the number of pilot symbols in each pilot cluster is an odd number. That is, the number of known symbols at both sides of a pilot symbol at a center position of each pilot cluster is the same. Of course, the number of pilot symbols in each pilot cluster may also be an even number. In comparison with the case of being an even number, when the number of pilot symbols in each pilot cluster is an odd number, the effect of channel estimation is better.

The pilot cluster interval refers to an interval between pilot symbols at center positions of two neighboring pilot clusters. The unit of the interval is a resource block or a sub-carrier. In the example as shown in the lower portion of FIG. 1, the pilot cluster interval is 14.

As stated above, the design of pilot aggregation and known symbols can improve the precision of channel estimation while solving the problem of ICI. However, this will also cause a problem in regard to larger pilot overheads.

In view of this, the inventor of the present invention proposes a manner of adjusting a pilot aggregation width and/or a pilot cluster interval adaptively. This manner can adapt to the fast time-varying characteristic of the channel, and can reduce pilot overheads, thus increasing the throughput and the frequency utilization rate of the system level.

Hereinafter, the method for adjusting a pilot aggregation width and/or a pilot cluster interval adaptively will be described with reference to FIG. 2.

Figure 2:
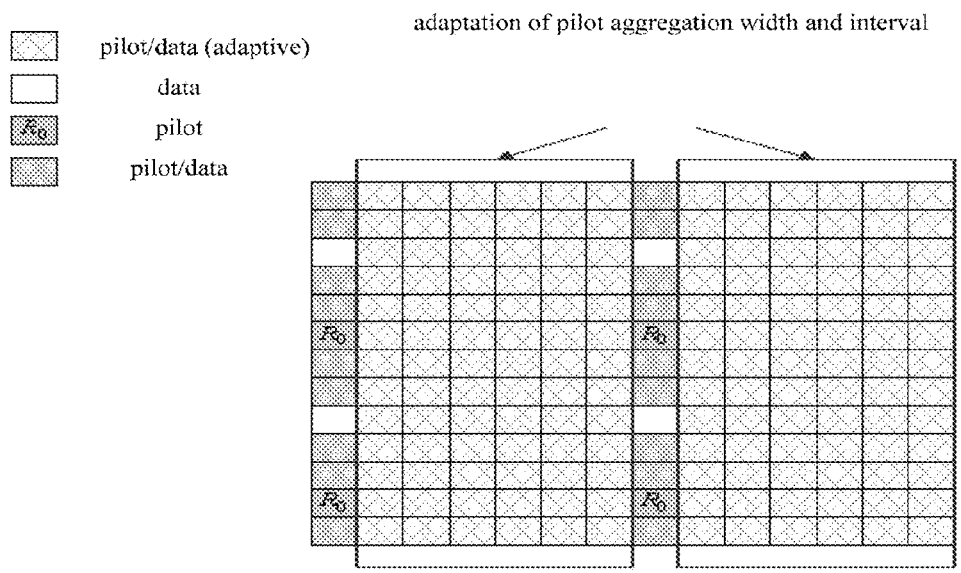
FIG. 2 is a diagram for explaining a method for adjusting a pilot aggregation width and/or a pilot cluster interval adaptively.

In FIG. 2, the horizontal direction is a time axis, and the vertical direction is a frequency axis. Each small square block represents one resource block. Each column is one OFDM symbol, which corresponds to all frequencies within a period of time, including several resource blocks. Taking the first column as an example, the first column corresponds to the first OFDM symbol, wherein R0 represents a pilot symbol at a center position of a pilot cluster. All of the two closely neighboring symbols above R0 and the two closely neighboring symbols below R0 are known symbols, for example pilot symbols or known data. The third symbol, i.e. the white square block, above R0 shows data. Apparently, one column as shown in FIG. 2 is equivalent to one row as shown in the lower portion of FIG. 1. In the first column in FIG. 2, the pilot aggregation width is 5; and the pilot cluster interval, i.e. the interval between two R0s, is 5.

The first seven columns as shown in FIG. 2 constitute a time slot (which is only an example), wherein the first column, i.e. the first symbol, is a training symbol. A pilot aggregation width and a pilot cluster interval of the training symbol can be set as a maximum pilot aggregation width and a minimum pilot cluster interval that can be accepted by the system performance. It can be seen that in the first symbol, i.e., the training symbol, the pilot aggregation technique according to the present invention is used. The maximum pilot aggregation width and the minimum pilot cluster interval are related to application scenarios of a wireless communication system; for example, the maximum pilot aggregation width and the minimum pilot cluster interval are determined in view of a maximum relative motion speed between the transmitting apparatus and the receiving apparatus, and maximum time delay spread as well as sub-carrier bandwidths and the like which are supported by the wireless communication system.

Then, in the second through seventh columns, i.e. in the portion framed by the black box, adaptive adjusting of a pilot aggregation width and/or a pilot cluster interval is performed.

The criterion of the adaptive adjusting is determining, according to a signal-to-noise ratio of a pilot aggregation bit stream of the training symbols after demodulation and before decoding, whether it is necessary to adjust a pilot aggregation width and/or a pilot cluster interval of a subsequent symbol.

That is, the reference of the adaptive adjusting is a signal-to-noise ratio of a bit stream of the training symbols after demodulation and before being decoded by a decoder.

Adjusted objects may be both of or either of the pilot aggregation width and the pilot cluster interval.

As an example, the adaptive adjusting can be performed according to the following criterion:

$$[D_{opt}, d_{opt}] = \arg\min_{D,d} \{SNR_{D,d} \mid SNR_{D,d} \geq SNR_{th}\} \quad \text{Formula (1)}$$

In Formula (1), $D_{opt}$ is an optimal pilot aggregation width, $d_{opt}$ is an optimal pilot cluster interval, $SNR_{D,d}$ is a bit signal-to-noise ratio at a decoder input which is measured when the pilot aggregation width is D and the pilot cluster interval is d, $SNR_{th}$ is a minimum acceptable decoder input bit signal-to-noise ratio, which can be determined through computer simulation according to equivalent code rate after punching, code block length and block error rate requirements, and argmin { } represents values of D and d which are determined by causing $SNR_{D,d}$ to be minimum in a case where $SNR_{D,d} \geq SNR_{th}$.

As another example, the adaptive adjusting can be performed according to the following criterion:

$$[D_{opt}, d_{opt}] = \arg\max_{D,d} \{SNR_{D,d} \mid SNR_0 - SNR_{D,d} \leq SNR'_{th}\} \quad \text{Formula (2)}$$

In Formula (2), $D_{opt}$ is an optimal pilot aggregation width, $d_{opt}$ is an optimal pilot cluster interval, $SNR_{D,d}$ is a bit signal-to-noise ratio at a decoder input which is measured when the pilot aggregation width is D and the pilot cluster interval is d, $SNR_0$ is a bit signal-to-noise ratio at a decoder input which is measured using the maximum pilot aggregation width and the minimum pilot cluster interval, $SNR'_{th}$ is a maximum acceptable signal-to-noise ratio loss, which is determined by those skilled in the art according to the requirements of system design, and argmin { } represents values of D and d which are determined by causing $SNR_{D,d}$ to be maximum in a case where $SNR_0 - SNR_{D,d} \leq SNR'_{th}$.

That is, a currently optimal pilot aggregation width and/or pilot cluster interval can be calculated according to a minimum acceptable decoder input signal-to-noise ratio or a maximum acceptable signal-to-noise ratio loss.

In a next scheduling period, the transmitting apparatus transmits data using the adjusted currently optimal pilot aggregation width and pilot cluster interval, and the receiving apparatus performs channel estimation and symbol detection using the adjusted currently optimal pilot aggregation width and pilot cluster interval, thus making it possible to adapt to the fast time-varying characteristic of the channel and reduce pilot overheads.

Preferably, when performing channel estimation, the channel estimation is performed only using a frequency domain signal received at a middle position of each pilot cluster after the pilot aggregation.

In this way, the complexity of the time-varying channel estimation algorithm can be reduced. Specifically: the time-varying channel estimation algorithm performs channel estimation using information received on each pilot symbol, so if only a signal received at a center position of each pilot cluster is used to perform time-varying channel estimation, the number of received signals corresponding to pilots involved in the channel estimation is reduced, thus reducing the complexity of the channel estimation algorithm.

The basic concept and main flow of the present invention are introduced above. Since the adjusting of the pilot aggregation width and the pilot cluster interval is based on a signal-to-noise ratio of a bit stream before decoding by a decoder in the receiving apparatus, the measurement of the related signal-noise ratio is necessarily performed in the receiving apparatus. However, the adjusting of the pilot aggregation width and the pilot cluster interval can be performed either in the transmitting apparatus or in the receiving apparatus. Thus, depending on different positions of the adjusting, related processing and flow are different, thereby constituting a first embodiment and a second embodiment of the present invention respectively.

Hereinafter, the first embodiment according to the present invention will be described with reference to FIGS. 3-6. In the first embodiment, the adaptive adjusting of the pilot aggregation width and/or the pilot cluster interval is performed at the receiving apparatus end.

Figure 3:
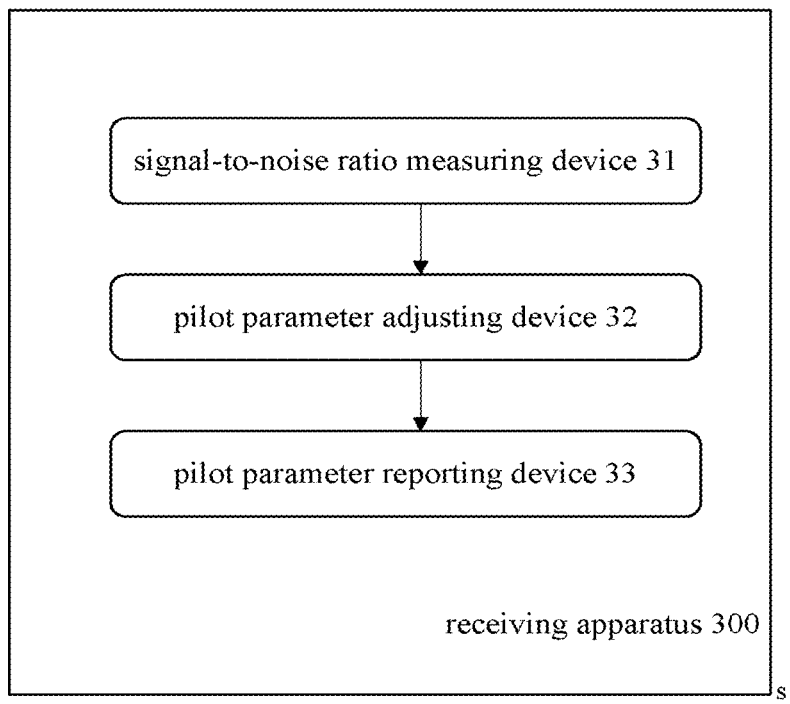
FIG. 3 is a structural block diagram illustrating a receiving apparatus according to a first embodiment of the present invention.

FIG. 3 is a structural block diagram illustrating a receiving apparatus according to the first embodiment of the present invention. As shown in FIG. 3, the receiving apparatus 300 according to the present invention comprises: signal-to-noise ratio measuring device 31 configured to measure a signal-to-noise ratio of a pilot aggregation bit stream after demodulation and before decoding; pilot parameter adjusting device 32 configured to adjust a pilot aggregation width and/or a pilot cluster interval adaptively according to the signal-to-noise ratio measured by the signal-to-noise measuring device; and pilot parameter reporting device 33 configured to report, to a transmitting apparatus, the pilot aggregation width and/or the pilot cluster interval adjusted by the pilot parameter adjusting device; wherein in a pilot aggregation signal corresponding to the pilot aggregation bit stream, each pilot symbol closely neighbors known symbols at both sides in a frequency domain, so as to constitute a pilot cluster, the pilot aggregation width refers to a total number of pilot symbols and known symbols contained in each pilot cluster, and the pilot cluster interval refers to an interval between pilot symbols at center positions of two neighboring pilot clusters.

In one embodiment, the pilot parameter adjusting device 32 is further configured to: determine, according to the signal-to-noise ratio of a training symbol, whether it is necessary to adjust the pilot aggregation width and/or the pilot cluster interval of a subsequent symbol; calculate a currently optimal pilot aggregation width and/or pilot cluster interval according to a minimum acceptable decoder input signal-to-noise ratio or a maximum acceptable signal-to-noise ratio loss, upon determination that it is necessary to adjust.

In one embodiment, in the pilot aggregation signal, a first symbol of each time slot is the training symbol, a pilot aggregation width and a pilot cluster interval of the training symbol are a maximum pilot aggregation width and a minimum pilot cluster interval that can be accepted by system performance.

Figure 4:
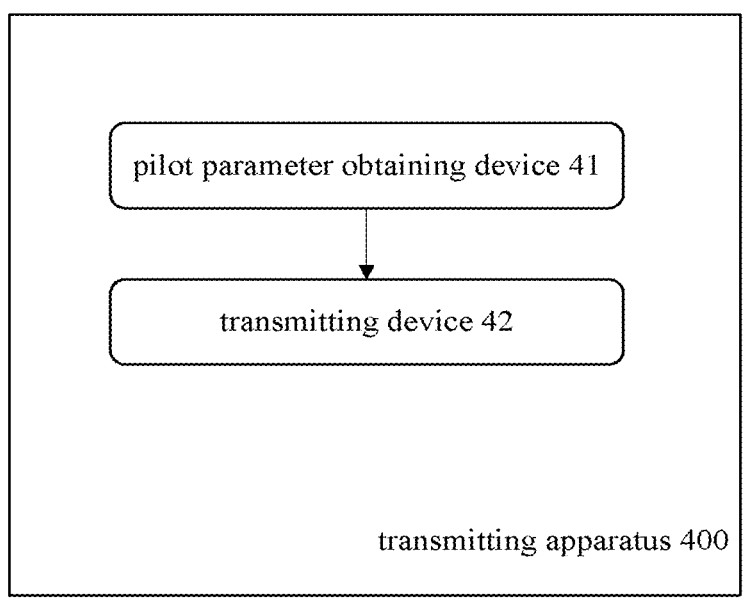
FIG. 4 is a structural block diagram illustrating a transmitting apparatus according to the first embodiment of the present invention.

FIG. 4 is a structural block diagram illustrating a transmitting apparatus according to the first embodiment of the present invention. As shown in FIG. 4, the transmitting apparatus 400 according to the present invention comprises: pilot parameter obtaining device 41 configured to obtain a pilot aggregation width and/or a pilot cluster interval reported by a receiving apparatus; and transmitting device 42 configured to transmit a pilot aggregation signal to the receiving apparatus according to the pilot aggregation width and/or the pilot cluster interval obtained by the pilot parameter obtaining device; wherein in the pilot aggregation signal, each pilot symbol closely neighbors known symbols at both sides in a frequency domain, so as to constitute a pilot cluster, the pilot aggregation width refers to a total number of pilot symbols and known symbols contained in each pilot cluster, and the pilot cluster interval refers to an interval between pilot symbols at center positions of two neighboring pilot clusters.

Figure 5:
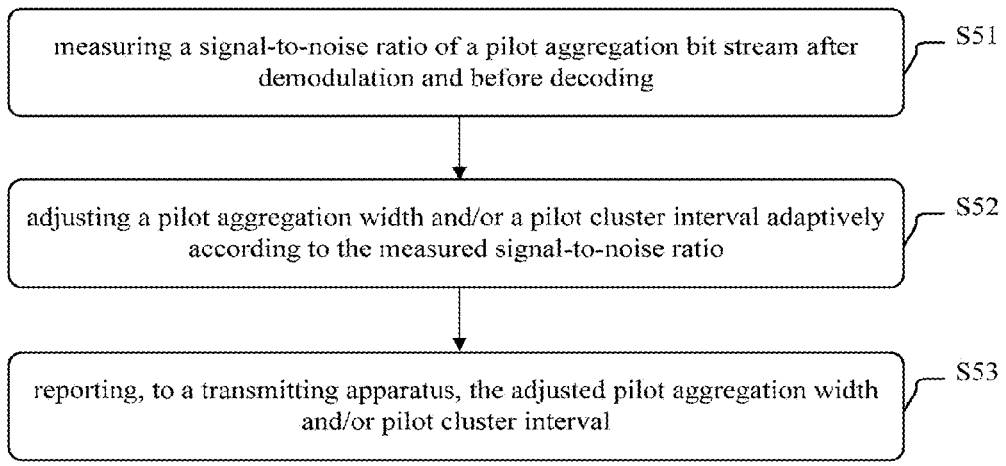
FIG. 5 is a flowchart illustrating a receiving method according to the first embodiment of the present invention.

FIG. 5 is a flowchart illustrating a receiving method according to the first embodiment of the present invention. As shown in FIG. 5, the receiving method according to the present invention comprises the steps of: measuring a signal-to-noise ratio of a pilot aggregation bit stream after demodulation and before decoding (step S51); adjusting a pilot aggregation width and/or a pilot cluster interval adaptively according to the measured signal-to-noise ratio (step S52); and reporting, to a transmitting apparatus, the adjusted pilot aggregation width and/or pilot cluster interval (step S53); wherein in a pilot aggregation signal corresponding to the pilot aggregation bit stream, each pilot symbol closely neighbors known symbols at both sides in a frequency domain, so as to constitute a pilot cluster, the pilot aggregation width refers to a total number of pilot symbols and known symbols contained in each pilot cluster, and the pilot cluster interval refers to an interval between pilot symbols at center positions of two neighboring pilot clusters.

Figure 6:
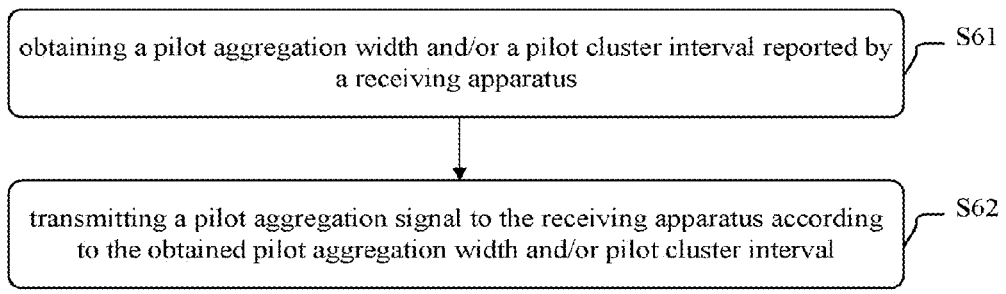
FIG. 6 is a flowchart illustrating a transmitting method according to the first embodiment of the present invention.

FIG. 6 is a flowchart illustrating a transmitting method according to the first embodiment of the present invention. As shown in FIG. 6, the transmitting method according to the present invention comprises the steps of: obtaining a pilot aggregation width and/or a pilot cluster interval reported by a receiving apparatus (step S61); and transmitting a pilot aggregation signal to the receiving apparatus according to the obtained pilot aggregation width and/or pilot cluster interval (step S62); wherein in the pilot aggregation signal, each pilot symbol closely neighbors known symbols at both sides in a frequency domain, so as to constitute a pilot cluster, the pilot aggregation width refers to a total number of pilot symbols and known symbols contained in each pilot cluster, and the pilot cluster interval refers to an interval between pilot symbols at center positions of two neighboring pilot clusters.

Hereinafter, the second embodiment according to the present invention will be described with reference to FIGS. 7-10. In the second embodiment, the adaptive adjusting of the pilot aggregation width and/or the pilot cluster interval is performed at the transmitting apparatus end.

Figure 7:
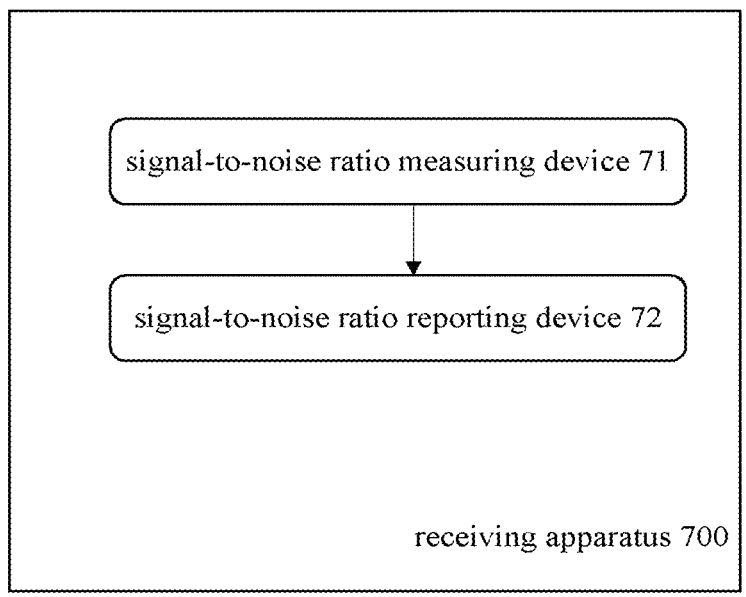
FIG. 7 is a structural block diagram illustrating a receiving apparatus according to a second embodiment of the present invention.

FIG. 7 is a structural block diagram illustrating a receiving apparatus according to a second embodiment of the present invention. As shown in FIG. 7, the receiving apparatus 700 according to the present invention comprises: signal-to-noise ratio measuring device 71 configured to measure a signal-to-noise ratio of a pilot aggregation bit stream after demodulation and before decoding; and signal-to-noise ratio reporting device 72 configured to report the signal-to-noise ratio measured by the signal-to-noise measuring device to a transmitting apparatus; wherein in a pilot aggregation signal corresponding to the pilot aggregation bit stream, each pilot symbol closely neighbors known symbols at both sides in a frequency domain, so as to constitute a pilot cluster, the pilot aggregation width refers to a total number of pilot symbols and known symbols contained in each pilot cluster, and the pilot cluster interval refers to an interval between pilot symbols at center positions of two neighboring pilot clusters.

Figure 8:
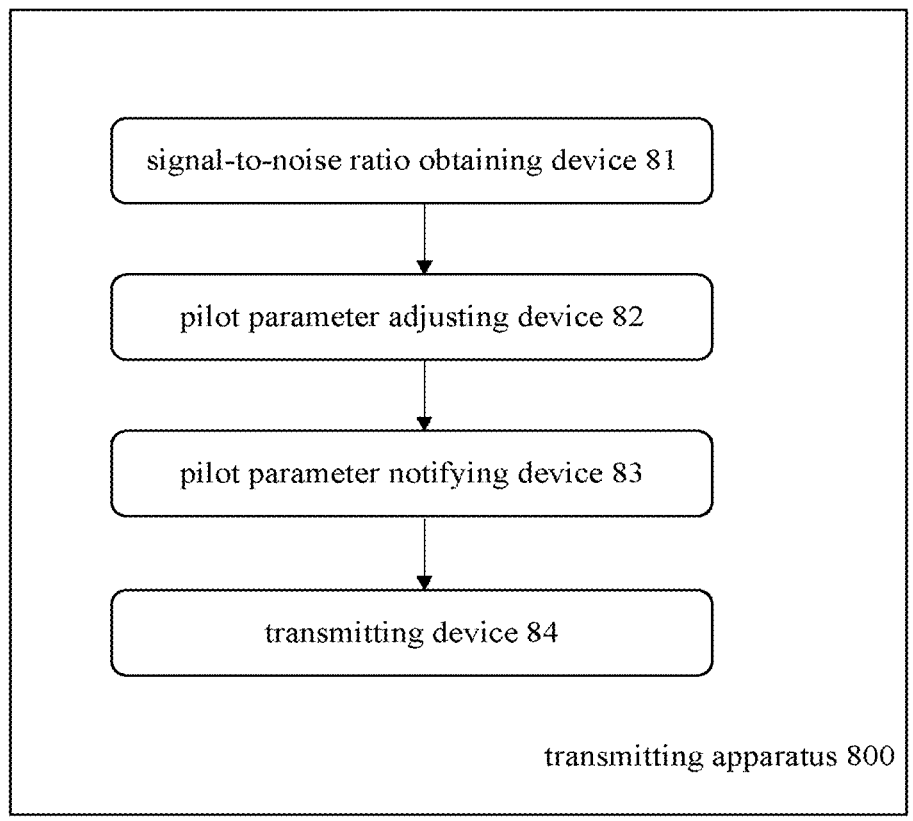
FIG. 8 is a structural block diagram illustrating a transmitting apparatus according to the second embodiment of the present invention.

FIG. 8 is a structural block diagram illustrating a transmitting apparatus according to the second embodiment of the present invention. As shown in FIG. 8, the transmitting apparatus 800 according to the present invention comprises: signal-to-noise ratio obtaining device 81 configured to obtain a signal-to-noise ratio reported by a receiving apparatus; pilot parameter adjusting device 82 configured to adjust a pilot aggregation width and/or a pilot cluster interval adaptively according to the signal-to-noise ratio obtained by the signal-to-noise obtaining device; pilot parameter notifying device 83 configured to notify the receiving apparatus of the pilot aggregation width and/or the pilot cluster interval adjusted by the pilot parameter adjusting device; and transmitting device 84 configured to transmit a pilot aggregation signal to the receiving apparatus according to the pilot aggregation width and/or the pilot cluster interval adjusted by the pilot parameter adjusting device; wherein in the pilot aggregation signal, each pilot symbol closely neighbors known symbols at both sides in a frequency domain, so as to constitute a pilot cluster, the pilot aggregation width refers to a total number of pilot symbols and known symbols contained in each pilot cluster, and the pilot cluster interval refers to an interval between pilot symbols at center positions of two neighboring pilot clusters.

In one embodiment, the pilot parameter adjusting device 82 is further configured to: determine, according to the signal-to-noise ratio of a training symbol, whether it is necessary to adjust the pilot aggregation width and/or the pilot cluster interval of a subsequent symbol; calculate a currently optimal pilot aggregation width and/or pilot cluster interval according to a minimum acceptable decoder input signal-to-noise ratio or a maximum acceptable signal-to-noise ratio loss, upon determination that it is necessary to adjust.

In one embodiment, in the pilot aggregation signal, a first symbol of each time slot is the training symbol, a pilot aggregation width and a pilot cluster interval of the training symbol are a maximum pilot aggregation width and a minimum pilot cluster interval that can be accepted by system performance.

Figure 9:
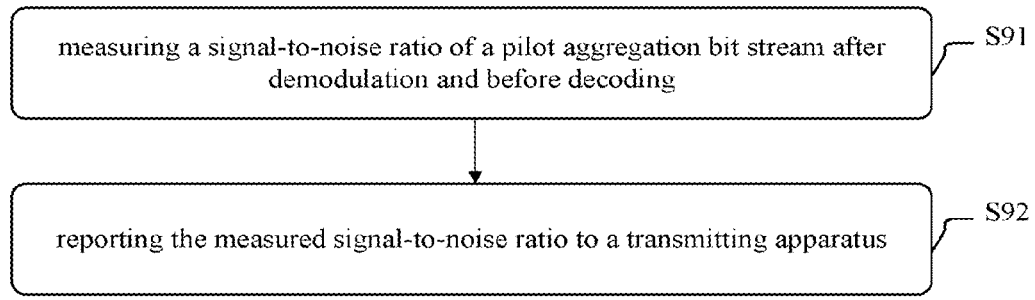
FIG. 9 is a flowchart illustrating a receiving method according to the second embodiment of the present invention.

FIG. 9 is a flowchart illustrating a receiving method according to the second embodiment of the present invention. As shown in FIG. 9, the receiving method according to the present invention comprises the steps of: measuring a signal-to-noise ratio of a pilot aggregation bit stream after demodulation and before decoding (step S91); and reporting, to a transmitting apparatus, the measured signal-to-noise ratio (step S92); wherein in a pilot aggregation signal corresponding to the pilot aggregation bit stream, each pilot symbol closely neighbors known symbols at both sides in a frequency domain, so as to constitute a pilot cluster, the pilot aggregation width refers to a total number of pilot symbols and known symbols contained in each pilot cluster, and the pilot cluster interval refers to an interval between pilot symbols at center positions of two neighboring pilot clusters.

Figure 10:
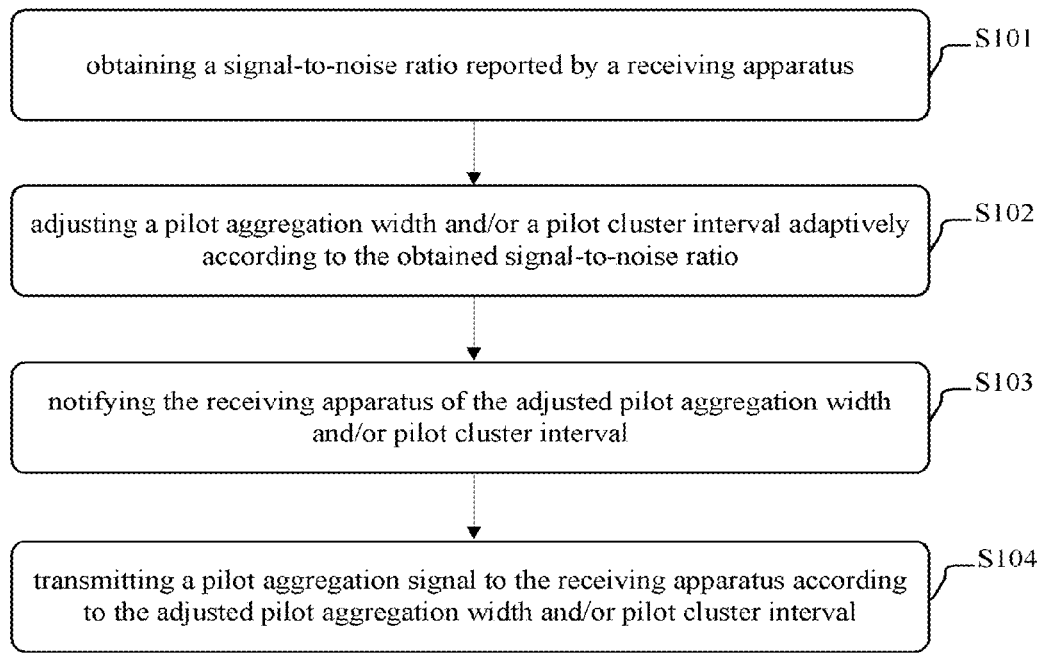
FIG. 10 is a flowchart illustrating a transmitting method according to the second embodiment of the present invention.

FIG. 10 is a flowchart illustrating a transmitting method according to the second embodiment of the present invention. As shown in FIG. 10, the transmitting method according to the present invention comprises the steps of: obtaining a signal-to-noise ratio reported by a receiving apparatus (step S101); adjusting a pilot aggregation width and/or a pilot cluster interval adaptively according to the obtained signal-to-noise ratio (step S102); and notifying the receiving apparatus of the adjusted pilot aggregation width and/or pilot cluster interval (step S103); and transmitting a pilot aggregation signal to the receiving apparatus according to the adjusted pilot aggregation width and/or pilot cluster interval (step S104); wherein in the pilot aggregation signal, each pilot symbol closely neighbors known symbols at both sides in a frequency domain, so as to constitute a pilot cluster, the pilot aggregation width refers to a total number of pilot symbols and known symbols contained in each pilot cluster, and the pilot cluster interval refers to an interval between pilot symbols at center positions of two neighboring pilot clusters.

Since the respective processing involved in the transmitting apparatus, the receiving apparatus, the transmitting method and the receiving method according to the present invention have been described previously in detail, repeated descriptions of these processing is omitted herein for the sake of conciseness.

The technical solutions of the first embodiment and the second embodiment of the present invention greatly reduce ICI by arranging known symbols closely neighboring at both sides of a pilot symbol, match a current receiving and transmitting ends relative motion speed and a wireless channel environment by using a training symbol and reduce pilot overheads as far as possible without influencing communication quality by adjusting parameters of pilot aggregation adaptively. Due to the reduced pilot overheads, the throughput and the frequency utilization rate of the system are increased. The complexity of the channel estimation algorithm is reduced when performing channel estimation only using a signal received at a center position of each pilot cluster. Correspondingly, the overall system performance in the high-speed motion environment is improved.

In addition, it shall also be noted that the respective constituent devices and units in the above apparatus can be configured by software, firmware, hardwire or a combination thereof. Specific means or manners that can be used for the configuration will not be stated repeatedly herein since they are well-known to those skilled in the art. In case of implementation by software or firmware, programs constituting the software are installed from a storage medium or a network to a computer (e.g. the universal computer 1100 as shown in FIG. 11) having a dedicated hardware structure; the computer, when installed with various programs, can implement various functions and the like.

Figure 11:
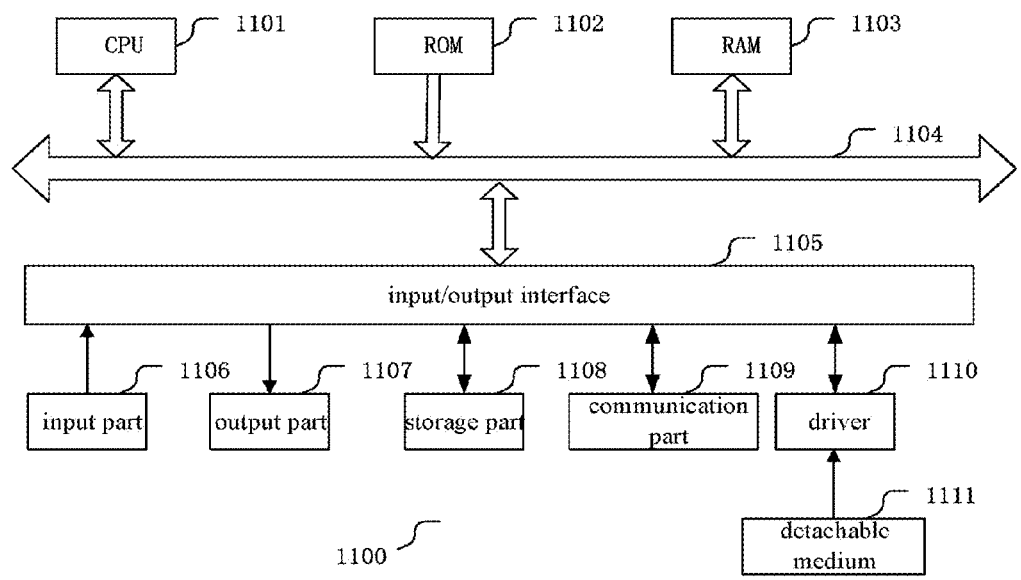
FIG. 11 is a schematic block diagram illustrating a computer for implementing the methods and the apparatuses according to the embodiments of the present invention.

FIG. 11 illustrates a schematic block diagram of a computer which may be used for implementing the methods and apparatuses according to the embodiments of the present invention.

In FIG. 11, a central processing unit (CPU) 1101 executes various processing according to a program stored in a read-only memory (ROM) 1102 or a program loaded from a storage section 1108 to a random access memory (RAM) 1103. In the RAM 1103, data needed when the CPU 1101 executes various processing and the like is also stored according to requirements. The CPU 1101, the ROM 1102 and the RAM 1103 are connected to each other via a bus 1104. An input/output interface 1105 is also connected to the bus 1104.

The following components are connected to the input/output interface 1105: an input part 1106 (including a keyboard, a mouse and the like); an output part 1107 (including a display, such as a Cathode Ray Tube (CRT), a Liquid Crystal Display (LCD) and the like, as well as a loudspeaker and the like); the storage part 1108 (including a hard disk and the like); and a communication part 1109 (including a network interface card such as an LAN card, a modem and so on). The communication part 1109 performs communication processing via a network such as the Internet. According to requirements, a driver 1110 may also be connected to the input/output interface 1105. A detachable medium 1111 such as a magnetic disk, an optical disc, a magnetic optical disc, a semiconductor memory and the like may be installed on the driver 1110 according to requirements, such that a computer program read therefrom is installed in the storage part 1108 according to requirements.

In the case of carrying out the foregoing series of processing by software, programs constituting the software are installed from a network such as the Internet or a storage medium such as the detachable medium 1111.

Those skilled in the art should appreciate that such a storage medium is not limited to the detachable medium 1111 storing therein a program and distributed separately from the apparatus to provide the program to a user as shown in FIG. 11. Examples of the detachable medium 1111 include a magnetic disk (including floppy disk (registered trademark)), a compact disc (including compact disc read-only memory (CD-ROM) and digital versatile disc (DVD), a magneto optical disc (including mini disc (MD)(registered trademark)), and a semiconductor memory. Alternatively, the storage medium may be the ROM 1102, hard disks included in the storage part 1108, and the like in which programs are stored, and are distributed concurrently with the apparatus including them to users.

The present invention further provides a program product storing machine-readable instruction code. When read and executed by a machine, the instruction code can implement the methods according to the embodiments of the present invention.

Correspondingly, a storage medium for carrying the program product storing the machine-readable instruction code is also included in the disclosure of the present invention. The storage medium includes but is not limited to a floppy disk, an optical disc, a magnetic optical disc, a memory card, a memory stick and the like.

In the forgoing descriptions of the specific embodiments of the present invention, features described and/or shown for one embodiment may be used in one or more other embodiments in an identical or similar way, be combined with features in other embodiments, or substitute features in other embodiments.

It should be emphasized that when used in the text, the term "comprise/include" refers to existence of features, elements, steps or components, but does not exclude existence or addition of one or more other features, elements, steps or components.

In addition, the method according to the present invention is not limited to be performed in the temporal order described in the specification, but may also be performed sequentially, in parallel or independently in other temporal orders. Thus, the order of performing the method as described in the specification does not constitute a limitation to the technical scope of the present invention.

Although the present invention has been disclosed above by describing the specific embodiments of the present invention, it should be understood that all the embodiments and examples as described above are exemplary, but not limitative. Those skilled in the art could design various modifications, improvements or equivalents for the present invention within the spirit and scope of the appended claims. The modifications, improvements or equivalents shall also be regarded as being included in the scope of protection of the present invention.

What is claimed is:

1. A receiving apparatus, comprising:
a signal-to-noise ratio measuring device configured to measure a signal-to-noise ratio of a pilot aggregation bit stream after demodulation and before decoding;
a pilot parameter adjusting device configured to adjust a pilot aggregation width and/or a pilot cluster interval adaptively according to the signal-to-noise ratio measured by the signal-to-noise measuring device; and
a pilot parameter reporting device configured to report, to a transmitting apparatus, the pilot aggregation width and/or the pilot cluster interval adjusted by the pilot parameter adjusting device;
wherein in a pilot aggregation signal corresponding to the pilot aggregation bit stream, each pilot symbol closely neighbors known symbols at both sides in a frequency domain, so as to constitute a pilot cluster, the pilot aggregation width refers to a total number of pilot symbols and known symbols contained in each pilot cluster, and the pilot cluster interval refers to an interval between pilot symbols at center positions of two neighboring pilot clusters.

2. The receiving apparatus according to claim 1, wherein the pilot parameter adjusting device is further configured to:
determine, according to the signal-to-noise ratio of a training symbol, whether it is necessary to adjust the pilot aggregation width and/or the pilot cluster interval of a subsequent symbol;
calculate a currently optimal pilot aggregation width and/or pilot cluster interval according to a minimum acceptable decoder input signal-to-noise ratio or a maximum acceptable signal-to-noise ratio loss, upon determination that it is necessary to adjust.

3. The receiving apparatus according to claim 2, wherein in the pilot aggregation signal, a first symbol of each time slot is the training symbol, a pilot aggregation width and a pilot cluster interval of the training symbol are a maximum pilot aggregation width and a minimum pilot cluster interval that can be accepted by system performance.

4. A transmitting apparatus, comprising:
processing circuitry configured to form a training symbol having a pilot aggregation parameter;
a transmitter configured to transmit the training symbol to a receiving apparatus; and
a receiver configured receive an indication of signal-to-noise ratio of a reception of the training symbol reported by the receiving apparatus; wherein
the processing circuitry is further configured to form an adjusted pilot aggregation parameter; the adjusted pilot aggregation parameter including an adjustment to at least one of a pilot aggregation width and a pilot cluster interval of the training symbol according to the signal-to-noise ratio reported by the receiving apparatus, and
the transmitter is configured to transmit a pilot aggregation signal to the receiving apparatus according to the adjusted pilot aggregation parameter;
wherein in the pilot aggregation signal, each pilot symbol closely neighbors known symbols at both sides in a frequency domain, so as to constitute the pilot cluster, the pilot aggregation width refers to a total number of pilot symbols and known symbols contained in each pilot cluster, and the pilot cluster interval refers to an interval between pilot symbols at center positions of two neighboring pilot clusters.

5. The transmitting apparatus according to claim 4, wherein the processing circuitry, is further configured to:
determine, according to the signal-to-noise ratio of a training symbol, whether it is necessary to adjust the pilot parameter of a subsequent symbol;
calculate a currently optimal pilot parameter according to a minimum acceptable decoder input signal-to-noise ratio or a maximum acceptable signal-to-noise ratio loss, upon determination that it is necessary to adjust.

6. The transmitting apparatus according to claim 4, wherein in the pilot aggregation signal, a first symbol of each time slat is the training symbol, the pilot aggregation width and the pilot cluster interval of the training symbol are a maximum pilot aggregation width and a minimum pilot cluster interval that can be accepted by system performance.

7. The transmitting apparatus according to claim 4, the adjusted pilot aggregation parameter include the pilot aggregation width and the pilot cluster interval.

8. A receiving method, comprising:
measuring a signal-to-noise ratio of a pilot aggregation bit stream after demodulation and before decoding;
adjusting a pilot aggregation width and/or a pilot cluster interval adaptively according to the measured signal-to-noise ratio; and reporting, to a transmitting apparatus, the adjusted pilot aggregation width and/or pilot cluster interval;

wherein in a pilot aggregation signal corresponding to the pilot aggregation bit stream, each pilot symbol closely neighbors known symbols at both sides in a frequency domain, so as to constitute a pilot cluster, the pilot aggregation width refers to a total number of pilot symbols and known symbols contained in each pilot cluster, and the pilot cluster interval refers to an interval between pilot symbols at center positions of two neighboring pilot clusters.

9. A transmitting method, comprising:

forming with processing circuitry a training symbol having a pilot aggregation parameter;

transmitting the training symbol to a receiving apparatus;

receiving an indication of signal-to-noise ratio for the training symbol reported by the receiving apparatus;

forming with the processing circuitry an adjusted pilot aggregation parameter, the adjusted pilot aggregation parameter including an adjustment to at least one of a pilot aggregation width and a pilot cluster interval of the training symbol according to the signal-to-noise ratio reported by the receiving apparatus, and transmitting a pilot aggregation signal to the receiving apparatus according to the adjusted pilot aggregation parameter;

wherein in the pilot aggregation signal, each pilot symbol closely neighbors known symbols at both sides in a frequency domain, so as to constitute the pilot cluster, the pilot aggregation width refers to a total number of pilot symbols and known symbols contained in each pilot cluster, and the pilot cluster interval refers to an interval between pilot symbols at center positions of two neighboring pilot clusters.

10. The transmitting method according to claim 9, wherein the pilot parameter includes the pilot aggregation width and the pilot cluster interval.

\* \* \* \* \*